United States Patent [19]
Pickering et al.

[11] Patent Number: 5,239,242
[45] Date of Patent: Aug. 24, 1993

[54] MOTOR DIRECTION CONTACTOR SWITCHING CONTROL

[75] Inventors: William Pickering, University Heights; Bruce A. Nielsen, Painesville, both of Ohio

[73] Assignee: Caterpillar Industrial Inc., Mentor, Ohio

[21] Appl. No.: 753,149

[22] Filed: Aug. 30, 1991

[51] Int. Cl.$^5$ ............................................... H02P 7/00
[52] U.S. Cl. ...................................... 318/280; 318/65
[58] Field of Search .................... 318/280, 286, 65, 70, 318/256, 258, 264, 362, 367, 369, 375; 361/23, 30, 31, 100; 388/824, 838, 903

[56] References Cited

U.S. PATENT DOCUMENTS

| | | | |
|---|---|---|---|
| 3,883,786 | 5/1975 | McNaughton et al. | 318/317 |
| 3,980,934 | 9/1976 | Wright | 318/139 |
| 4,412,158 | 10/1983 | Jefferson et al. | 318/284 X |
| 4,463,293 | 7/1984 | Hornung et al. | 318/284 |
| 4,499,409 | 2/1985 | Bauer | 318/284 X |
| 4,691,149 | 9/1987 | Baumgartner et al. | 318/331 |
| 4,897,882 | 1/1990 | Pickering | 388/801 |

FOREIGN PATENT DOCUMENTS

2118381 12/1985 United Kingdom .

Primary Examiner—Jonathan Wysocki
Attorney, Agent, or Firm—Stephen L. Noe

[57] ABSTRACT

Motor control systems having direction contacts for steering current through a motor are commonly associated with electrical industrial vehicles, such as lift trucks. Advantageously, the operation of the direction contacts should be optimized in order to prevent switching the contacts when current is present to the extent that such switching can be eliminated. The instant apparatus includes a logic device for receiving speed and direction demand signals and responsively controlling the direction contacts associated with a vehicle motor. The logic device also receives signals from a current sensor responsive to the magnitude of electrical current flowing through the electric motor. In response to the motor current signal indicating a value less than a predetermined value concurrent with either the motor direction demand signal having a neutral value or the motor speed demand signal having a zero value, the logic means produces a neutral motor direction command signal. Therefore, optimal control of the motor direction contacts is attained.

7 Claims, 4 Drawing Sheets

Fig_2_

Fig_3_

Fig_4_

MOTOR DIRECTION CONTACTOR SWITCHING CONTROL

DESCRIPTION

1. Technical Field

This invention relates generally to an apparatus and method for controlling the direction contacts associated with an electric motor and more particularly to an apparatus and method for controllably operating the direction contactors in accordance with predetermined vehicle conditions.

2. Background Art

Bi-directional electric motors are associated with various types of industrial equipment in common use today. For example, industrial work vehicles including lift trucks commonly include traction or drive motors that can operate in either forward or reverse directions. These motors are used to rotate the wheels of the vehicle in corresponding directions. The direction of operation of the motors is commonly controlled by the arrangement and orientation of electrical switching contacts surrounding either the armature or field windings of the motor. Motor direction is controlled by opening and closing respective ones of the direction contacts causing electrical current to flow in a desired direction through the motor winding.

The speed of operation of the electrical drive motor is commonly responsive to a speed selection device such as an accelerator pedal. The direction of operation responds to the position of a direction selection lever which normally includes forward, reverse, and neutral positions. Selection of a particular direction in conjunction with an accelerator demand causes the motor to operate in a predetermined manner.

Drive motors associated with industrial vehicles are subjected to some particularly demanding operating situations. It is common for an operator to drive the vehicle in a first direction and then move the direction control lever to the opposite direction without releasing the accelerator pedal. This is called "plugging" the vehicle and causes the direction contactors to reverse the flow of current to the motor through the motor winding. This causes an electrical breaking effect on the motor and is a useful control technique. However, any time directional contactors are opened or closed while current is flowing in a circuit, destructive arcing occurs across the contacts. It is desirable to incorporate circuitry to minimize such arching. Furthermore, it is advantageous to minimize the possibility that all of the direction contactors will be closed around the motor winding at the same time. This could occur, for example, if the direction is reversed, but one set of contacts fails to open either because the contacts have welded together or are otherwise mechanically frozen or because the electro magnetic coil or something operating the coil driving the contactors is defective. In this case, a short circuit situation is encountered that can cause excessively high current flow in the motor winding and may cause damage to the vehicle.

In order to minimize contact arcing, it is desirable to change the contact status only when no current is flowing through the motor winding. If the vehicle is being driven in a first direction and the direction control is switched to neutral, current continues to flow through the motor winding for an appreciable period of time. Therefore, it is desirable to prevent opening the contacts until this current flow ceases. In a like manner, if the vehicle is moving in a first direction and the accelerator pedal is released, flyback current continues to flow through the motor winding and the contacts should not be opened. However, opening contacts under these conditions is a presently accepted manner of operating such motor control circuits.

The present invention is directed to overcoming one or more of the problems as set forth above.

DISCLOSURE OF THE INVENTION

In one aspect of the present invention, an apparatus for controlling the direction contacts associated with the drive motor of an electric vehicle is provided. The vehicle includes an electric power source for energizing the motor, a speed selection device for controllably producing a plurality of motor speed demand signals having a predetermined range of values representing respective desired motor speeds from zero to a predetermined maximum speed, and a direction selection means for controllably producing neutral, forward, and reverse motor direction demand signals. The apparatus includes a logic means for receiving the speed and direction demand signals and responsively controllably producing motor speed command and motor direction command signals. A direction contactor receives the motor direction command signals and controllably responsively opens and closes respective ones of the direction contacts. A switching device receives the motor speed command signals and responsively delivers electrical power from the electrical power source to the motor through respective ones of the direction contacts. The logic device delays producing a neutral motor direction command signal for a predetermined time after the occurrence of at least one of the motor direction demand signal changing from a forward or reverse value to a neutral value or the motor speed demand signal changing from a value representing a non-zero desired motor speed to a value representing zero desired motor speed.

In a second aspect of the present invention, a method for controlling the direction contacts associated with the drive motor of an electric vehicle is provided. The vehicle includes an electrical power source for energizing the motor. The method includes the steps of producing motor speed and neutral, forward, and reverse motor direction demand signals. Motor speed command and motor direction command signals are produced in response to the respective demand signals. Electrical current flowing through the motor is sensed and produces a motor current feedback signal having a value responsive to the magnitude of sensed current flow. The motor current feedback signal is received and produces a neutral motor direction demand signal in response to the motor current feedback signal value indicating a motor current magnitude less than a predetermined value, concurrent with either the motor direction demand signal having the neutral value or the motor speed demand signal having a value representing zero desired motor speed.

The instant invention provides a direction contact control which advantageously minimizes switching the direction contacts when current is flowing through the contacts. In addition the control insures that a short circuit condition does not develop as a result of closing all of the direction contacts simultaneously.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
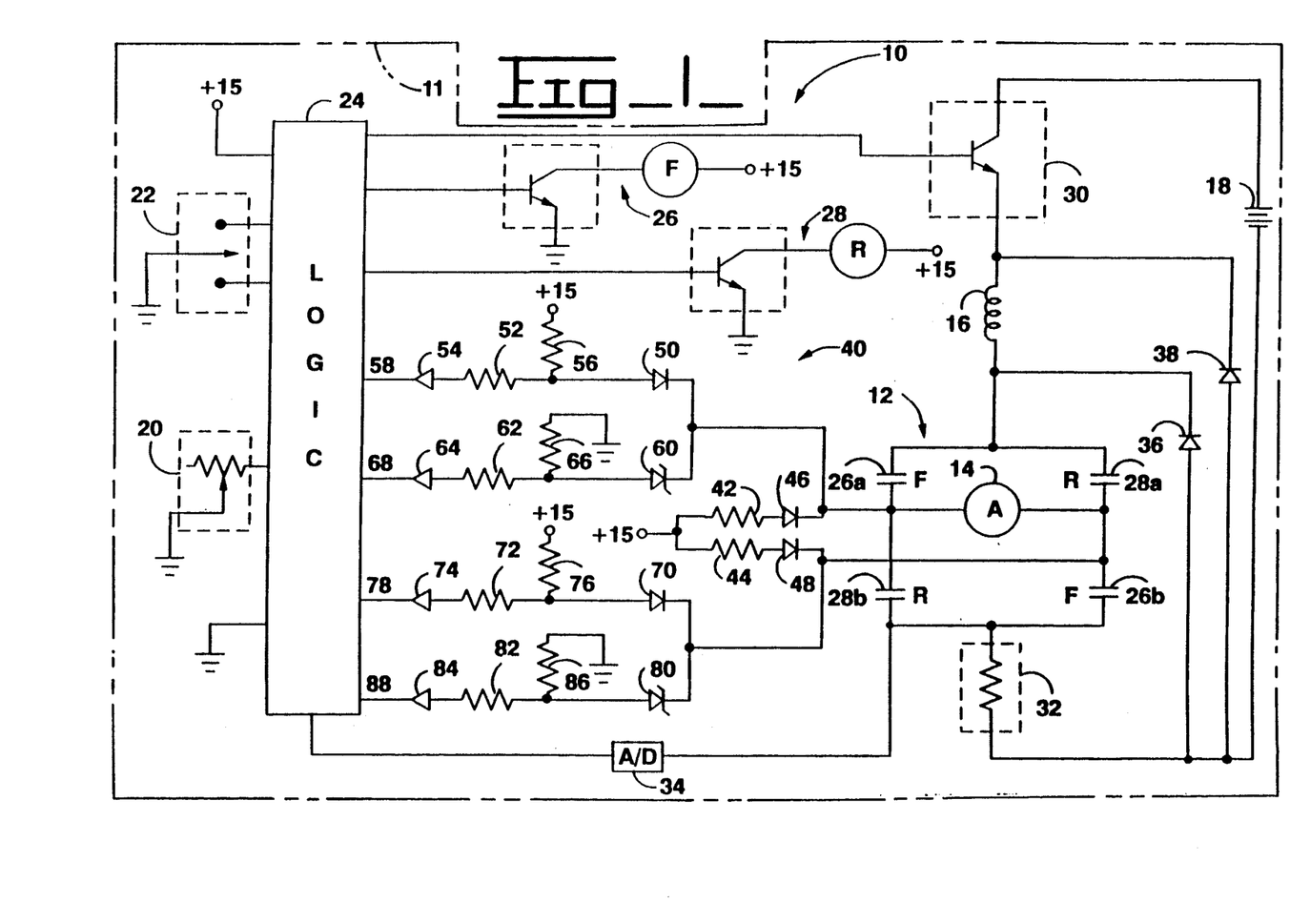
FIG. 1 is a schematic representation of an electrical circuit associated with one embodiment of the present invention.

Referring first to FIG. 1, an apparatus embodying certain of the principles of the present invention is generally indicated by the reference number 10. It should be understood that the following detailed description relates to the best presently known embodiment of the apparatus 10. However, the apparatus 10 can be accomplished using other embodiments, as will be apparent to those skilled in the art, without departing from the scope or the intent of the appended claims.

The apparatus 10 is associated with a vehicle, for example, an industrial work vehicle such as a lift truck. The particular vehicle or vehicle design forms no part of the instant invention and is not shown in the drawings. The vehicle includes an electric motor 12 having armature and field windings 14,16, an electric power source 18, a speed selection device 20, and a direction selection device 22. Advantageously, the electrical power source 18 is a storage battery of the type generally associated with electric vehicles.

The speed selection device 20 controllably produces motor speed demand signals. Various speed selection devices can be utilized, for example, a potentiometer type analog device or a digital encoder. The particular choice of speed selection device does not affect the operation of the apparatus described below. Signals delivered from the speed selection device 20 should be suitable for electronic processing and ultimately determine the actual motor speed of the electric motor 12. The motor speed demand signals produced by the speed selection device 20 have a predetermined range of values representing respective desired speeds from zero speed to a predetermined maximum speed.

The direction selection device 22 controllably produces motor direction demand signals. Again, the particular choice of device is not relevant to the claimed invention. The device should have the ability to select forward, reverse, and neutral motor operation. A simple embodiment is merely a spring biased, center "off" switch capable of being controlled by a direction selection lever. The direction selection device 22 should produce signals suitable for electronic processing. These signals determine the status of the contacts that ultimately control the direction of the motor 12.

A logic means 24 receives the speed and direction demand signals and responsively controllably produces motor speed command and motor direction command signals. In the preferred embodiment of the apparatus 10, the logic device 24 is a properly programmed microprocessor.

Direction contactor means 26,28 receive the motor direction command signals and controllably responsively open and close associated direction contacts 26a,26b,28a,28b. Typically, each direction contactor 26,28 includes an associated electromagnetic coil and a driver circuit connected between the logic means 24 and the coil. In response to a command from the logic means 24, the driver circuit allows current to flow through the electromagnetic coil and responsively operates the associated contacts.

A switching means 30 receives the motor speed command signals from the logic means 24 and responsively delivers electrical power from the electrical power source 18 to the motor 12 through respective ones of the direction contacts 26a,26b,28a,28b. The switching means 30 is advantageously a transistorized chopper control circuit that produces pulse width modulated current signals. However, other electrical switching means can be used in place of the transistorized chopper.

A current transducer means 32 senses electrical current flowing through the motor 12 and produces a motor current feedback signal having a value responsive to the magnitude of the sensed current flow. A simple current transducer can be provided by connecting a known shunt resistance between the negative terminal of the power source 18 and the motor circuit. The end of the shunt connected to the motor circuit is also connected to the logic means 24 through an appropriate analog to digital converter 34. Any current flowing through the motor circuit will result in a voltage being developed across the current transducer 32. The current magnitude signal is delivered to the analog to digital converter 34 and a resulting digital signal is delivered to the logic means 24.

In a typical motor control circuit, the contacts 26a,26b,28a,28b surround, for example, the motor armature 14. A plugging diode 36 is connected across the armature 14, permitting plugging current to circulate through the armature 14. In like manner, a flyback diode 38 is connected between the negative terminal of the power source 18 and one end of the motor field winding 16. Essentially, the flyback diode 38 is connected across the entire motor 12 and permits flyback currents to circulate through the motor 12. This is a fairly standard arrangement for such a motor control circuit.

Direction contact transducer means 40 sense the opened and closed states of the motor direction contacts 26a,26b,28a,28b and responsively produce direction contact feedback signals. The feedback signals are delivered to the logic means 24. In the preferred embodiment, the direction contact transducer means 40 includes first and second resistors 42,44 connecting a power source, for example, plus 15 volts, through respective diodes 46,48 to the opposite ends of the motor armature 14. The cathode of the diode 46 is also connected to the cathode of a diode 50 which, in turn, is connected through a resistor 52 and a buffer 54 to an input terminal 58 of the logic means 24. The junction between the diode 50 and the resistor 52 is also connected to the plus 15-volt supply through a resistor 56. The cathode of the diode 46 is also connected to the cathode of a zener diode 60 which, in turn, is connected through a resistor 62 and a buffer 64 to an input terminal 68 of the logic means 24. The junction between the resistor 62 and the diode 60 is connected to ground through a resistor 66. In like manner, the cathode of the diode 48 is connected to the cathode of a diode 70 which, in turn, is connected through a resistor 72 and a buffer 74 to an input terminal 78 of the logic means 24. The junction between the diode 70 and the resistor 72 is connected to the plus 15-volt supply through a resistor 76. Finally, the cathode of the diode 48 is also connected to the cathode of a zener diode 80 which, in turn, is connected through a resistor 82 and a buffer 84 to an input terminal 88 of the logic means 24. The junction between the diode 80 and the resistor 82 is connected to ground through a resistor 86. The zener diodes 60,80 have an avalanche voltage slightly higher than the positive bias voltage applied to the diodes, in the example above, approximately 16 volts.

Figure 2:
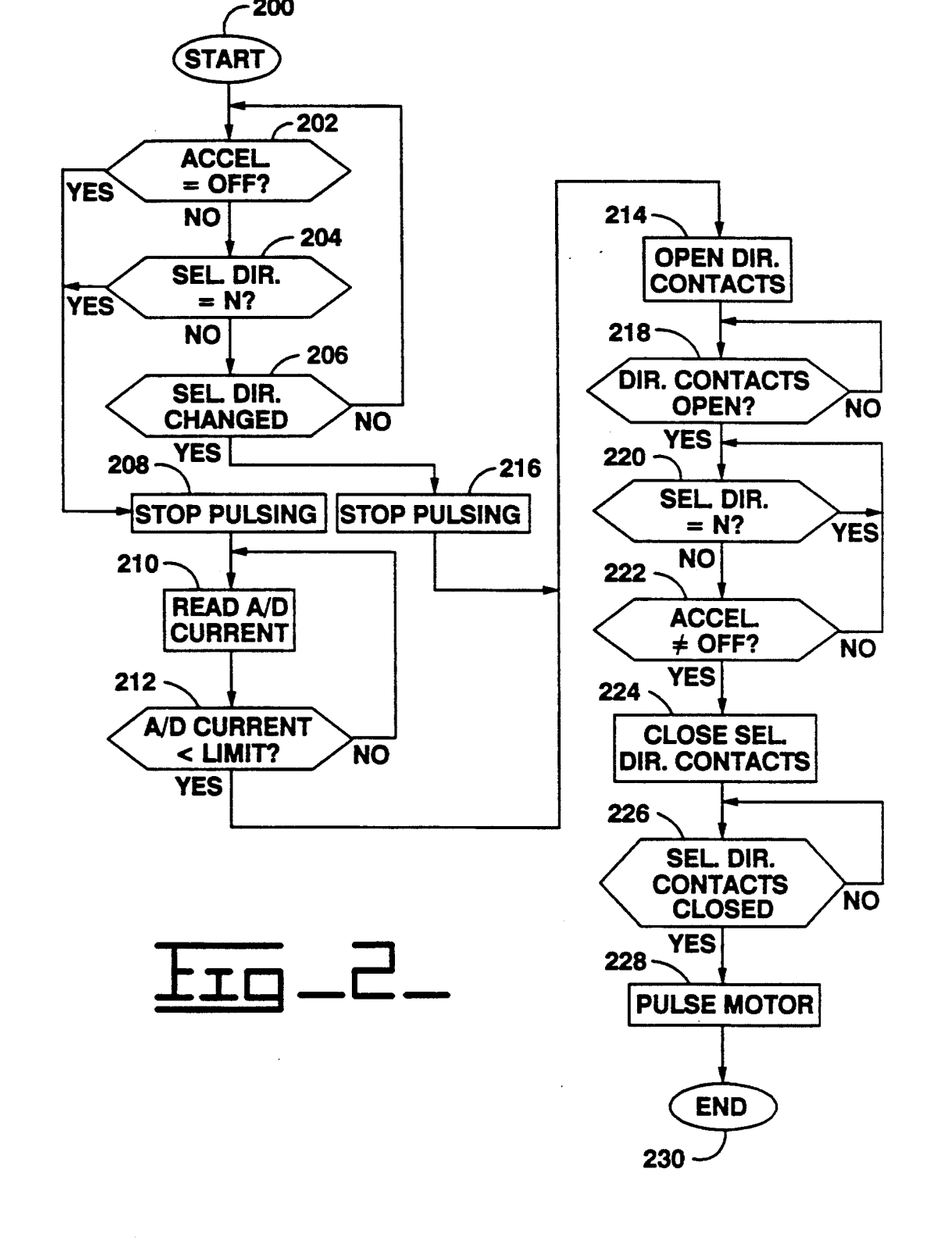
FIGS. 2-4 are a flowchart of software associated with the embodiment of FIG. 1.
Figure 3:
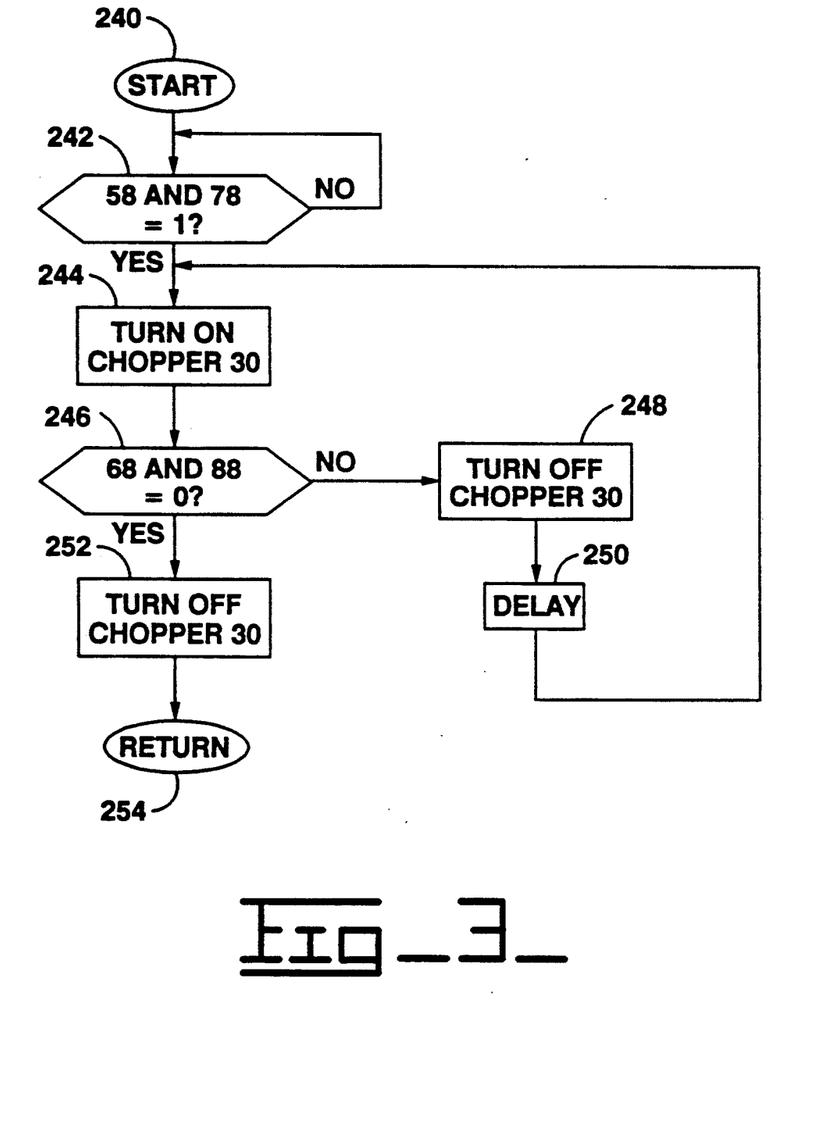
Figure 4:
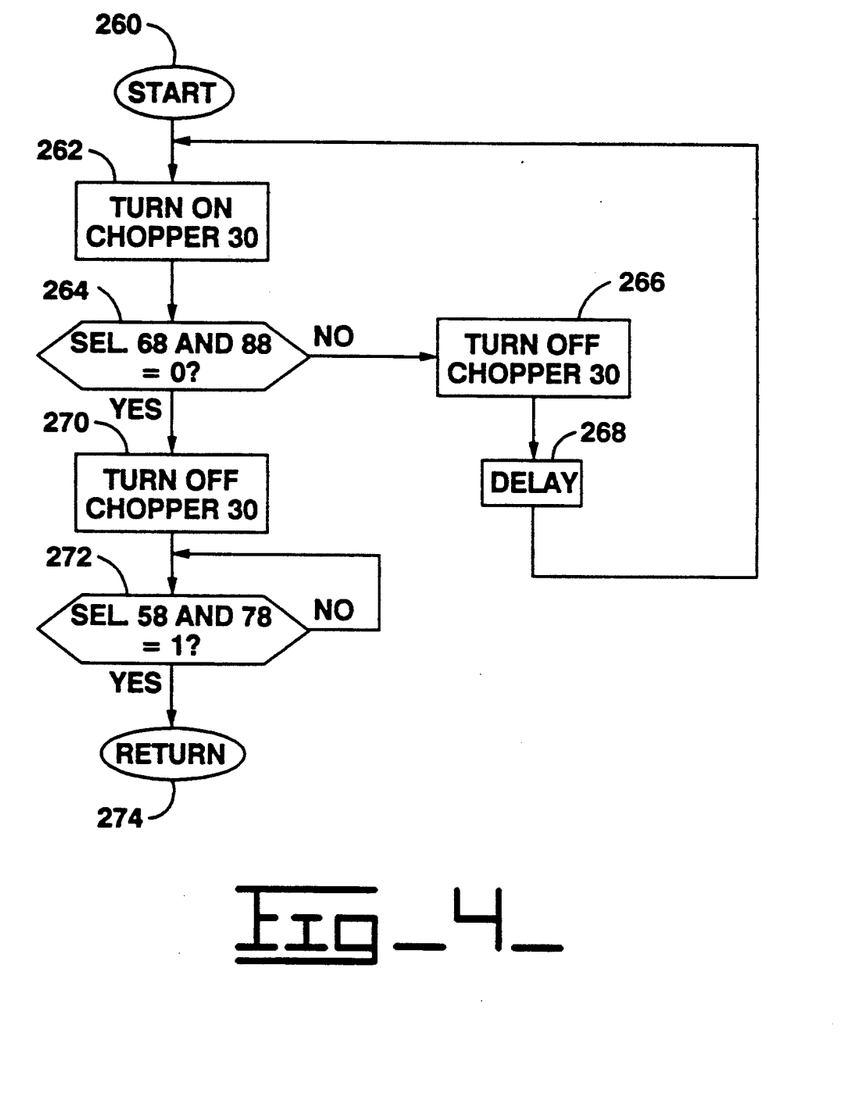

FIGS. 2-4 are a flowchart illustrating a computer software program used to implement the preferred embodiment described above. The program depicted in this flowchart is particularly well adapted for use with a microcomputer and associated components. Any suitable microcomputer may be utilized in practicing the disclosed embodiment. The flowchart constitutes a complete and workable design of the preferred software program and can actually be practiced on any suitable microcomputer system. The software program itself may be readily coded from this detailed flowchart using the instructions associated with the selected microcomputer. The process of writing the software code from the flowchart is a mere mechanical step for one skilled in the art.

FIG. 2 describes the main software routine used to implement an embodiment of the present invention. FIGS. 3 and 4 illustrate subroutines employed in the main routine of FIG. 2.

Beginning at the start block 200 the computer determines the accelerator position at the block 202. If the accelerator is not in the lowest or "off" position, the computer then checks the direction selected by the operator for operation of the vehicle in the block 204. If the selected direction is not "neutral", the computer then determines in the block 206 if the direction was changed from the last time it was checked. If not, control passes back to the block 202 where the routine repeats.

If either the accelerator is in the "off" position or the selected direction does equal "neutral", control passes to the block 208 where motor pulsing is turned "off" and then to the block 210 where the A/D converter 34 is interrogated to determine the level of current flowing in the motor 12. If the current indicated by the A/D convertor is still greater than the established current limit, as determined in the block 212, control loops back to the block 210 until such time as the current falls below the specified limit value. Once this happens, control passes to the block 214 where both direction contactors are commanded to open the associated direction contacts. In like manner, if the selected direction was changed from forward to reverse or vice versa, as determined in the block 206, the operator is attempting to plug the vehicle. In this case, pulsing is also stopped in the block 216 and control passes directly to the block 214.

In the block 218 the system determines whether or not the direction contacts are actually open. This determination is repeated until the contacts are found to be open and then control passes to the block 220 where the system determines whether or not the selected direction is equal to "neutral". If so, the program remains in a loop at block 220 waiting until the direction is shifted to either "forward" or "reverse". If the selected direction is not equal to "neutral" at the block 220, the accelerator position is checked in the block 222 to determine if an acceleration demand is being made. If not, control again loops back to the block 220 where the process is repeated. If an acceleration demand is being made, control passes to the block 224 where the selected direction contacts are commanded to close. Actual closing of these contacts is determined in the block 226, after which the motor 12 is again pulsed at the block 228. Finally, the main routine ends at the block 230.

The process of determining whether or not the direction contacts are open in the block 218 can be accomplished as shown in FIG. 3. FIG. 3 represents a subroutine that is actually run from the main routine of FIG. 2. Beginning at the start block 240 the system interrogates the direction transducer means 40 to determine whether or not the contacts are open. First, the signals delivered by the buffers 54,74 to the input terminals 58,78 are examined to determine if they are equal to a logic "one". If not, these terminals continue to be examined until both are found to be a logic "one". This occurs at the block 242. A logic "one" at both of the terminals 58,78 is an indication that contacts 26b,28b are both in an open state. Control then passes to the block 244 where the chopper 30 is turned "on" to apply power to the motor 14. The input terminals 68,88 are then examined to determine if the buffers 64,84 are delivering a logic "zero" signal in the block 246. If not, control passes to the block 248 where the chopper 30 is turned "off" and then to the block 250 where a short delay, for example, one millisecond, is imposed. Control then passes back to the block 244 where the cycle is repeated. Once both of the terminals 68,88 indicate the presence of a logic "zero", control passes to the block 252 where the chopper 30 is turned "off" and then to the return block 254 and back to the main program routine.

In like manner, FIG. 4 illustrates a software subroutine for determining when the contacts 26a,26b,28a,28b, are closed. Control again begins at the start block 260 and progresses to the block 262 where the chopper 30 is turned "on". The input terminals 68,88 are examined at the block 264 to see if either of them is at a logic "one" state. If not, control passes to the block 266 where the chopper 30 is turned "off" and then to the block 268 where a delay is again imposed. Control then passes back to the block 262 and the cycle is repeated until the selected one of the input terminals 68,88 is found to equal a logic "one". At that point, control passes to the block 270 where the chopper 30 is turned "off" and on to the block 272 where the input terminals 58,78 are examined to determine if the selected one of them is equal to a logic "zero". If not, the program continues to monitor these two points until one of them does equal a logic "zero", at which time control passes to the return block 274 and returns to the main program.

INDUSTRIAL APPLICABILITY

Operation of the apparatus 10 is best described in relation to its use on a vehicle, such as an electric lift truck. Several different operational scenarios are possible. Assume first that the vehicle is moving in a forward direction in response to the direction selection means 22 being set in the forward mode and the speed selection means 20 being at a non-zero position. Responsively, the direction contactors 26,28 will cause the forward direction contacts 26a,26b to be closed and the reverse direction contacts 28a,28b to be open. Current will flow from the power source 18 to the switching means 30 and the motor 12 to cause forward motion of the vehicle. In response to either releasing the speed selection means 20 so that a zero speed is selected or to switching the direction control means 22 to the neutral position, conventional control systems would cause the forward direction contacts 26a,26b to open. However, this would cause an arc across the affected contacts. Since there is really no reason to open the contacts at this time, the instant control system responds by continuing to sense the flow of motor current using the current transducer means 32 and opens the forward direction contacts 26a,26b only in response to sensing zero (or some other relatively low) motor current. Therefore, no arcing occurs.

Assuming the same initial conditions as set forth in the preceding paragraph, in the event that the opposite or reverse direction is selected by movement of the direction selection means 22, it is assumed that the operator desires to plug the vehicle. Under these circumstances, it is impossible to avoid some contact arcing because it is necessary to reverse the flow of current through the motor winding in order to accomplish the desired result. However, it is important that the opposite or reverse direction contacts 28a,28b not be closed before the forward contacts 26a,26b have opened. Having all four contacts closed simultaneously would produce a short circuit condition around the effective motor winding. Conventional control systems attempt to accomplish this by using a fixed time delay after the forward contactor 26 commands the associated contacts 26a,26b to open and before the reverse contactor 28 commands the reverse contacts 28a,28b to close. However, this fails to insure that the contacts have actually made the desired transitions and relies on average or mean contact operation times in order to establish the duration of the time delay. In the instant apparatus, the actual opened and closed condition of each contact set is sensed by the direction contact transducer means 40. Once the direction contact transducer 40 indicates to the logic means 24 that all contacts 26a,26b,28a,28b are opened, then the command is produced causing the reverse contacts 28a,28b to close and plugging can occur.

The operation of the transducer means 40 is quite straight forward. In order to determine whether all contacts are open the system first looks at the lower pair of contacts 26b,28b. These contacts are normally connected to ground through the current transducer 32. Therefore, so long as they are closed the input terminals of the buffers 54,74 will be pulled to a logic "zero" state and the input terminals 58,70 will likewise indicate a logic "zero". However, opening the contacts 26b,28b allows the respective pull up resistors 56,76 to impose a logic "one" on the buffers 54,74 which, responsively, produce logic "one" signals at the inputs 58,78. Once it is determined that the contacts 26b,28b are both open the upper contacts 26a,28a are likewise checked. In this case, the chopper 30 applies power to the contacts 26a,28a which is fed directly from the power supply 18. It is assumed that this power supply is greater than the avalanche voltage associated with the zener diodes 60,80. This will always be the case in common industrial vehicles which use 36-volt or higher power supplies. If either of the contacts 26a,28a are closed, power will be fed by the chopper through the respective contact set and the respective zener diode 60,80 producing a logic "one" at the respective input terminals 68,88. When both of these input terminals register a logic "zero" while the chopper 30 is supplying power to the contacts 26a,28a, it can be assumed that the contacts are open. Because power is only supplied momentarily and because the contacts 26b,28b are both already known to be open, there is no possibility that the motor 12 will try to rotate while the test is under way. Because of the speed of the computer, the determination can be made in a very small fraction of a second and control of the contacts 26a,26b,28a,28b will be very precise.

A very similar test is used to determine when the contacts 26a,26b,28a,28b have been successfully closed. The only difference is that the upper contacts are checked first by turning on the chopper 30 momentarily as just described, and the system concerns itself with determining that the selected one of the direction contacts 26a,28a are closed. Once this determination is made the system then checks the lower contacts 26b,28b to determine if the selected one of them has closed. Once the appropriate contacts are closed power is again applied by the chopper 30 in order to control the vehicle.

The apparatus 10 therefore advantageously eliminates or minimizes arcing under vehicle control situations in which it is possible to do so, and optimizes direction contact operation in situations where the contacts must be switched while current is present.

Other aspects, objects, and advantages of this invention can be obtained from a study of the drawings, the disclosure, and the appended claims.

We claim:

1. Apparatus for controlling the drive motor of an electric vehicle, said vehicle including an electric power source for energizing said motor and a logic device for controllably delivering electrical power to said drive motor, comprising:
   a speed selector connected to said logic device and movable between positions representing respective desired motor speeds from zero to a predetermined maximum speed;
   a direction selector connected to said logic device and movable between positions representing respective desired neutral, forward, and reverse motor directions;
   a plurality of direction contacts controllably connected to said logic device and connectable between said electric power source and said drive motor to control the direction and flow of electrical power through said motor;
   a current transducer connected in series with said drive motor and having an output terminal connected to said logic device; and
   wherein said logic device controllably opens all of said direction contacts in response to said current sensor indicating a motor current magnitude less than a predetermined value concurrent with at least one of said direction selector being positioned to indicate a desired neutral direction and said speed selector being positioned to indicate a desired motor speed of zero, and in response to said direction selector being moved from one of said forward and reverse positions to the other of said forward and reverse positions, said logic device sequentially: opens all of said direction contacts, verifies that all of said direction contacts are open, then closes respective ones of said direction contacts sufficient to cause electrical power to flow from said electric power source to said drive motor in a direction responsive to said instant position of said direction selector.

2. Apparatus for controlling direction contacts associated with the drive motor of an electric vehicle, said vehicle including an electric power source for energizing said motor, the apparatus comprising:
- speed selection means for controllably producing a plurality of motor speed demand signals having a predetermined range of values representing respective desired motor speeds from zero to a predetermined maximum speed;
- direction selection means for controllably producing neutral, forward, and reverse motor direction demand signals;
- logic means for receiving said speed and direction demand signals and responsively controllably producing motor speed command and motor direction command signals;
- direction contactor means for receiving said motor direction command signals and controllably responsively opening and closing respective ones of said direction contacts;
- switching means for receiving said motor speed command signals and responsively delivering electrical power from said electrical power source to said motor through respective ones of said direction contacts; and
- wherein said logic means delays producing a neutral motor direction command signal for a predetermined time after the occurrence of at least one of said motor direction demand signal changing from said forward or reverse value to said neutral value and said motor speed demand signal changing from a value representing a non-zero desired motor speed to a value representing zero desired motor speed.

3. Apparatus, as set forth in claim 2, including:
- a current transducer means for sensing electrical current flowing through said motor and producing a motor current feedback signal having a value responsive to the magnitude of the sensed current flow; and
- wherein said logic means delays producing said neutral motor direction command signal until said motor current feedback signal value indicates a motor current magnitude less than a predetermined value.

4. Apparatus, as set forth in claim 2, including:
- contact transducer means for sensing the open and closed states of said motor direction contacts and responsively producing direction contact feedback signals; and
- wherein said logic means receives said direction contact feedback signals and, in response to said motor direction demand signal changing from one of said forward and reverse direction demand signals to the other of said forward and reverse demand signals, sequentially: produces said neutral motor direction command signal, waits until said direction contact feedback signals indicate that all direction contacts are open, and produces the instant demanded one of said forward and reverse motor direction command signals.

5. A method for controlling direction contacts associated with the drive motor of an electric vehicle, said vehicle including an electric power source for energizing said motor, comprising the steps of:
- producing motor speed and neutral, forward, and reverse motor direction demand signals;
- producing motor speed command and motor direction command signals in response to said respective demand signals;
- sensing electrical current flowing through said motor and producing a motor current feedback signal having a value responsive to the magnitude of the sensed current flow;
- receiving said motor current feedback signal and producing a neutral motor direction command signal in response to said motor current feedback signal value indicating a motor current magnitude less than a predetermined value concurrent with at least one of said motor direction demand signal having said neutral value and said motor speed demand signal having a value representing zero desired motor speed;
- sensing the open and closed states of said motor direction contacts and responsively producing motor direction contact feedback signals;
- producing said neutral motor direction command signal in response to said motor direction demand signal changing from one of said forward and reverse direction demand signals to the other of said forward and reverse demand signals;
- verifying that all direction contacts are open; and
- producing the instant demanded one of said forward and reverse motor direction command signals.

6. Apparatus for controlling the drive motor of an electric vehicle, said vehicle including an electric power source for energizing said motor and a logic device for controllably delivering electrical power to said drive motor, comprising:
- a speed selector connected to said logic device and movable between positions representing respective desired motor speeds from zero to a predetermined maximum speed;
- a direction selector connected to said logic device and movable between positions representing respective desired neutral, forward, and reverse motor directions;
- a plurality of direction contacts controllably connected to said logic device and connectable between said electric power source and said drive motor to control the direction and flow of electrical power through said motor;
- a current transducer connected in series with said drive motor and having an output terminal connected to said logic device;
- a direction contact transducer connected to said direction contacts and having output terminals connected to said logic device to sense the open and closed states of said motor direction contacts; and
- wherein, in response to said direction selector being moved from one of said forward and reverse positions to the other of said forward and reverse positions, said logic device sequentially: opens all of said direction contacts, verifies that all of said direction contacts are open, then closes respective ones of said direction contacts sufficient to cause electrical power to flow from said electric power source to said drive motor in a direction responsive to said instant position of said direction selector.

7. A method for controlling direction contacts associated with the drive motor of an electric vehicle, said vehicle including an electric power source for energizing said motor, comprising the steps of:
- producing motor speed and neutral, forward, and reverse motor direction demand signals;
- producing motor speed command and motor direction command signals in response to said respective demand signals;

sensing electrical current flowing through said motor and producing a motor current feedback signal having a value responsive to the magnitude of the sensed current flow;

sensing the open and closed states of said motor direction contacts and responsively producing motor direction contact feedback signals;

producing said neutral motor direction command signal in response to said motor direction demand signal changing from one of said forward and reverse direction demand signals to the other of said forward and reverse demand signals;

verifying that all direction contacts are open; and producing the instant demanded one of said forward and reverse motor direction command signals.

* * * * *